(12) United States Patent
Engstrand

(10) Patent No.: US 8,436,287 B2
(45) Date of Patent: May 7, 2013

(54) SYSTEM AND/OR METHOD FOR READING, MEASURING AND/OR CONTROLLING INTENSITY OF LIGHT EMITTED FROM AN LED

(75) Inventor: Bradley W. Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 135 days.

(21) Appl. No.: 12/807,531

(22) Filed: Sep. 9, 2010

(65) Prior Publication Data

US 2011/0001035 A1    Jan. 6, 2011

Related U.S. Application Data

(63) Continuation-in-part of application No. 12/592,614, filed on Nov. 30, 2009, now Pat. No. 7,935,916, which is a continuation of application No. 11/975,777, filed on Oct. 22, 2007, now Pat. No. 7,626,153.

(51) Int. Cl.
*G01J 1/32*    (2006.01)
*H01J 40/14*    (2006.01)
*F21V 15/00*    (2006.01)

(52) U.S. Cl.
USPC ............................ 250/205; 250/239; 362/362

(58) Field of Classification Search .................. 250/205, 250/559.15, 239, 216, 221; 362/85, 221, 362/362, 546
See application file for complete search history.

(56) References Cited

U.S. PATENT DOCUMENTS

| | | | | |
|---|---|---|---|---|
| 7,157,294 | B2 * | 1/2007 | Uemura et al. | 438/27 |
| 7,242,001 | B1 * | 7/2007 | Hedges et al. | 250/343 |
| 2006/0261967 | A1 | 11/2006 | Marman et al. | |
| 2007/0075229 | A1 | 4/2007 | Engstrand | |
| 2007/0235639 | A1 | 10/2007 | Rains, Jr. | |
| 2009/0101794 | A1 | 4/2009 | Engstrand | |
| 2010/0072899 | A1 | 3/2010 | Engstrand | |

OTHER PUBLICATIONS

PCT Search Report, Jan. 3, 2012, ISA.
PCT Written Opinion, Jan. 3, 2012, ISA.

* cited by examiner

*Primary Examiner* — Kevin Pyo
*Assistant Examiner* — Don Williams
(74) *Attorney, Agent, or Firm* — Patents & TMS, P.C.

(57) ABSTRACT

A system and/or a method read, measure and/or control intensity of light emitted from a light-emitting diode (LED). A light detector may be located in a position adjacent to the LED for reading and/or measuring the intensity of light emitted from the LED. The LED and the light detector may be located in a cavity which may limit exposure of the LED and the light detector to ambient light. The cavity may have an aperture for allowing light emitted from the LED to exit the chamber to illuminate an environment in which the chamber is located. The aperture may be located between the cavity and a compartment, and the LED may emit light through the aperture into the compartment. An additional detector may be located in the compartment and/or may extend from the cavity through an additional aperture into the compartment.

21 Claims, 7 Drawing Sheets

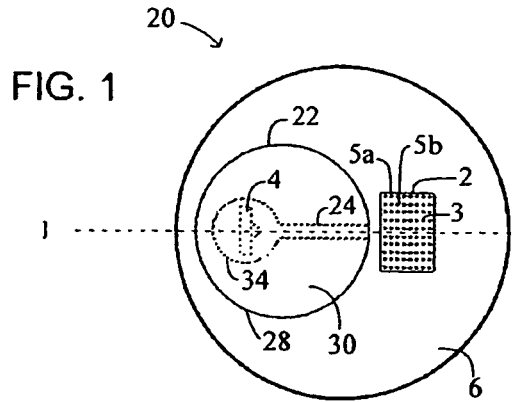
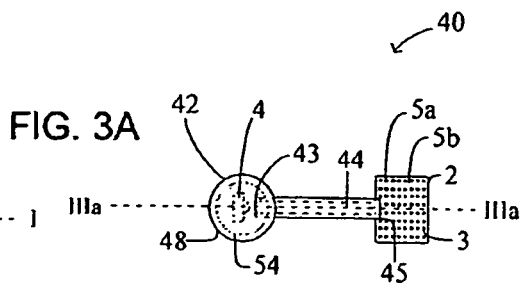
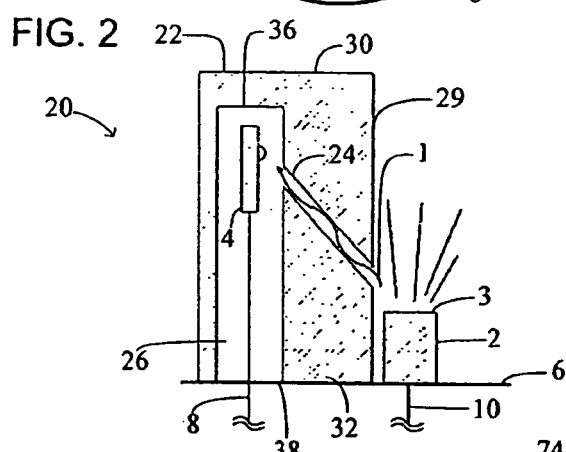
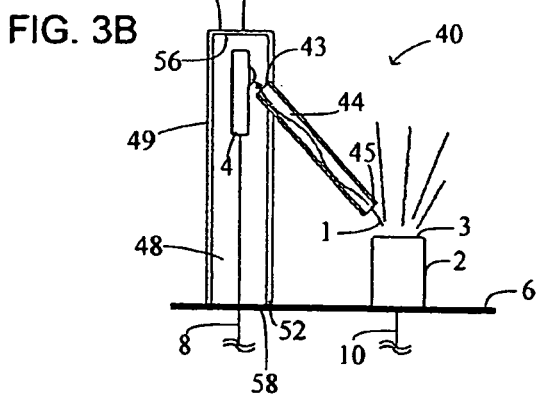
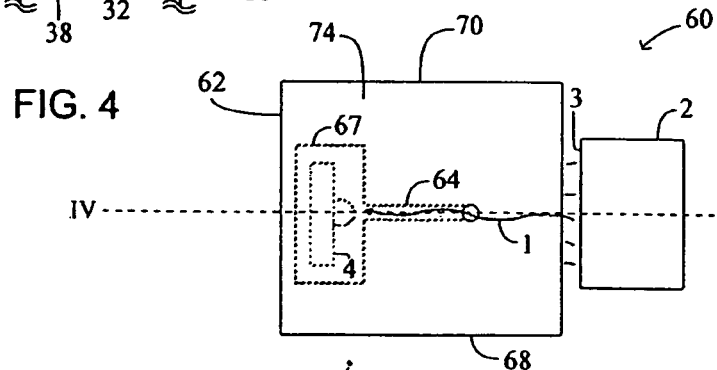
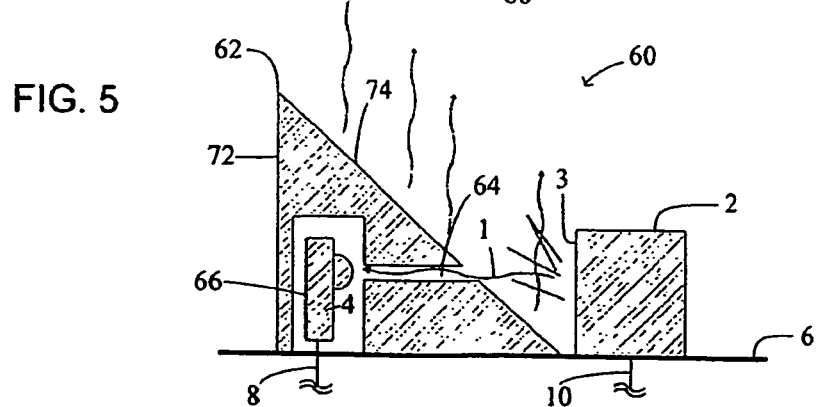

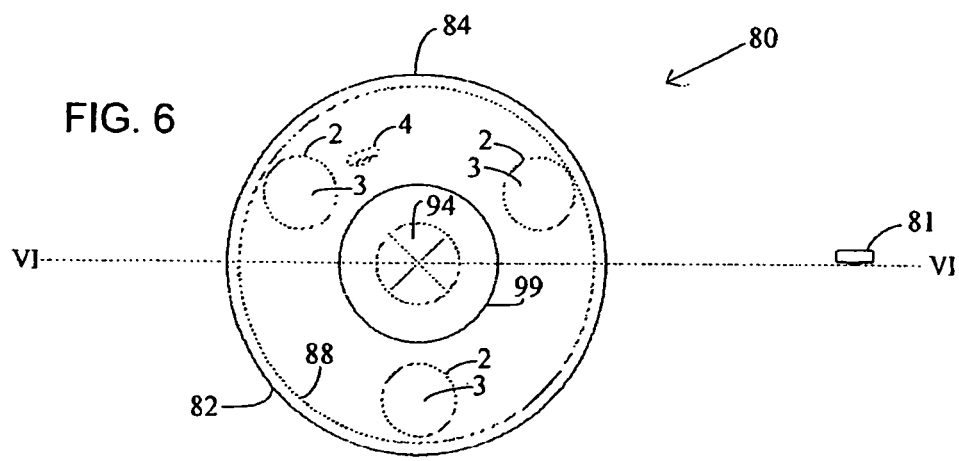
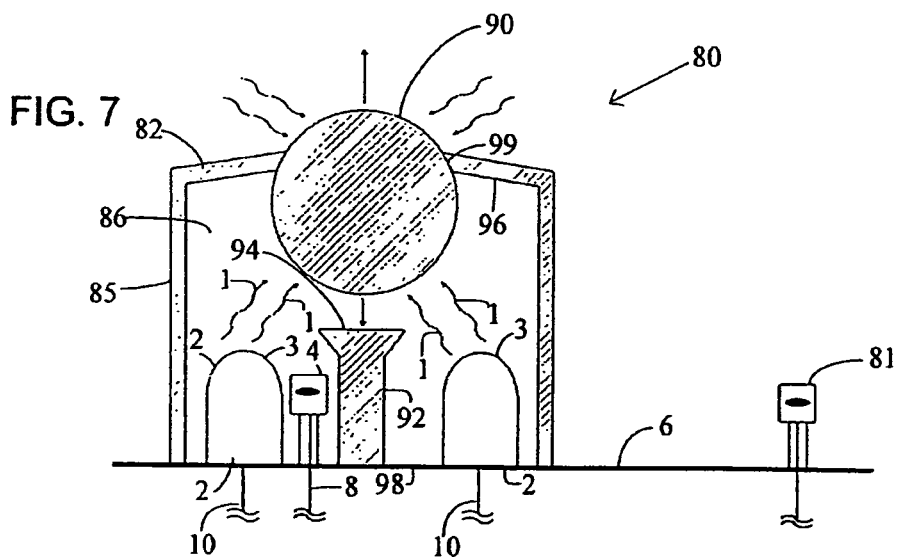
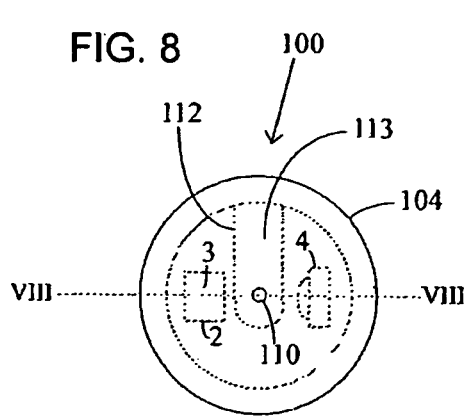
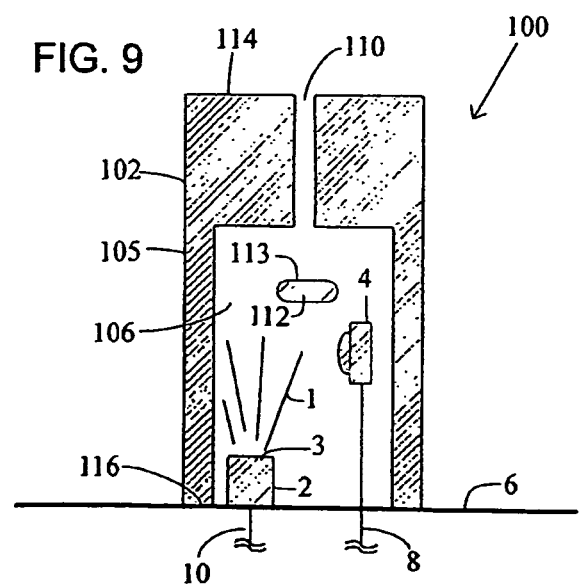

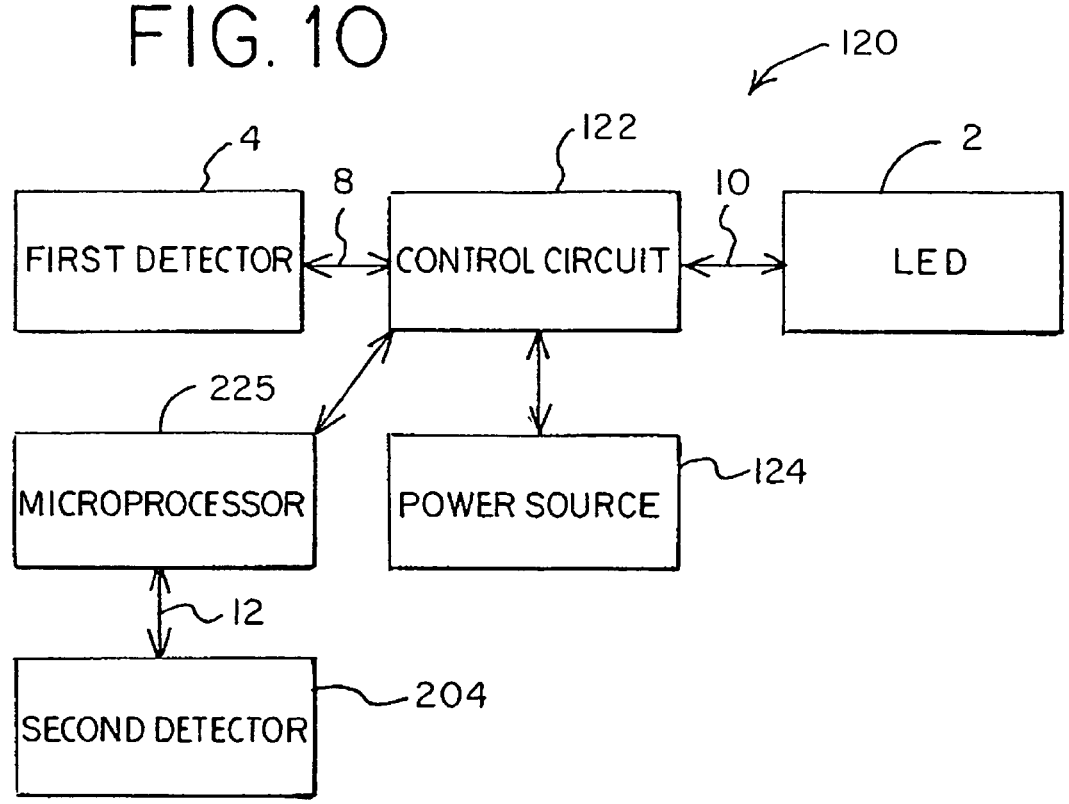

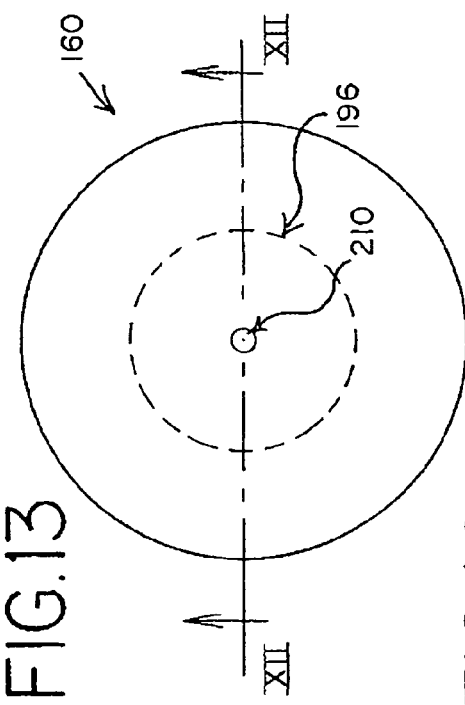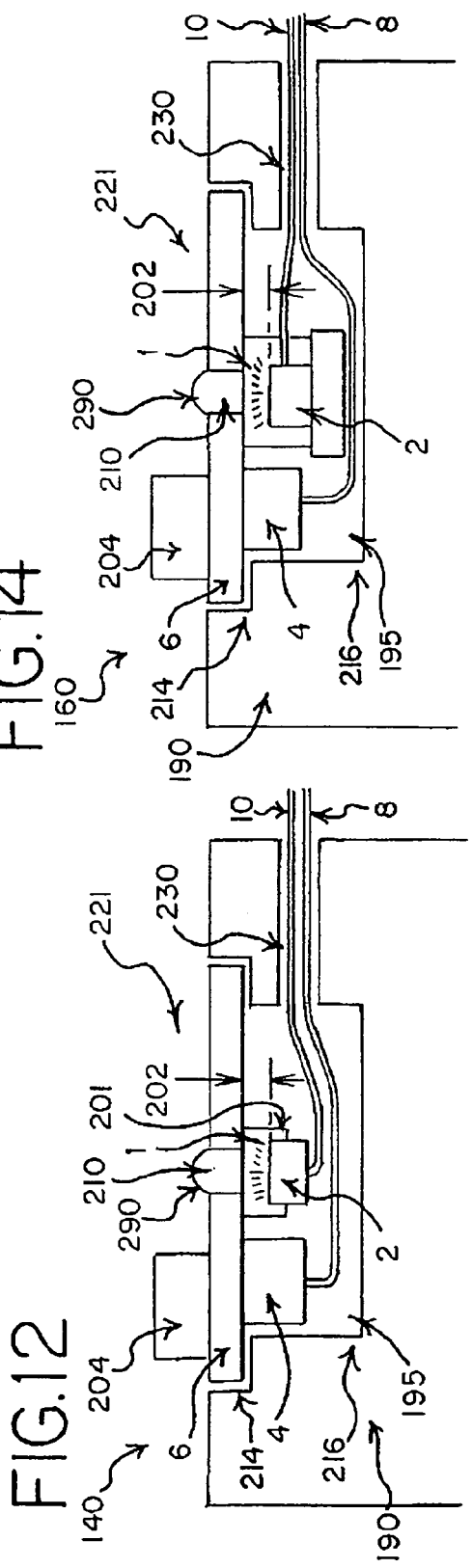

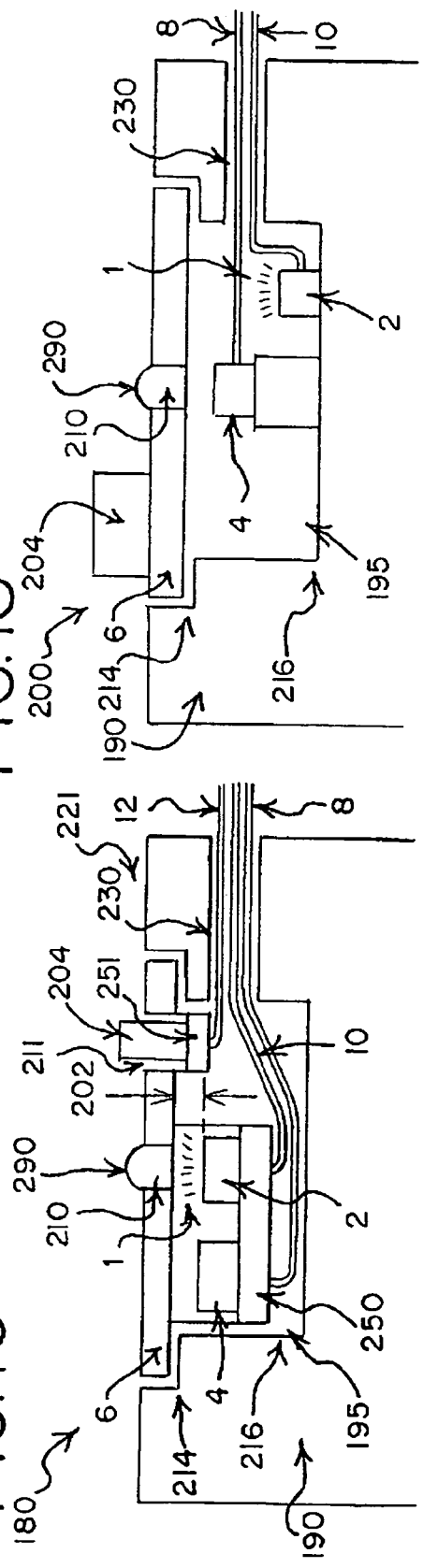

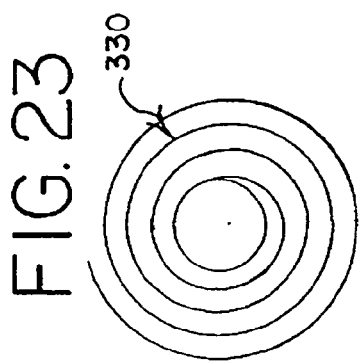
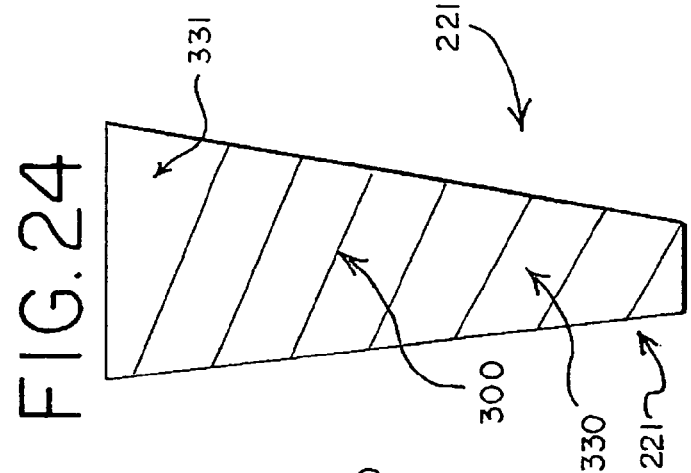
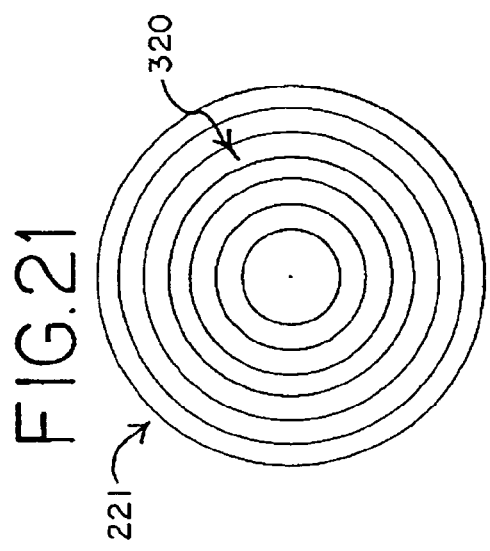
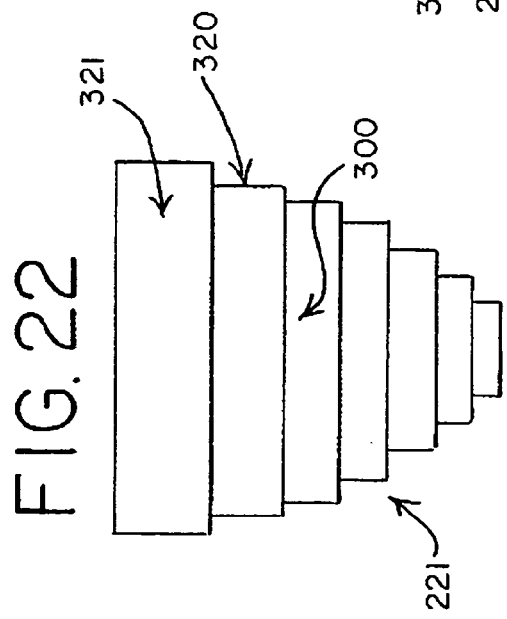
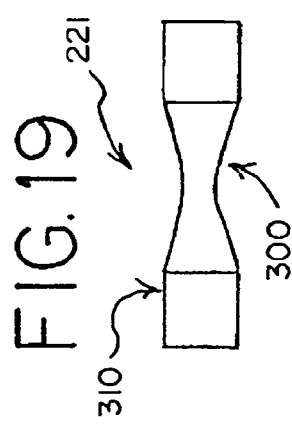
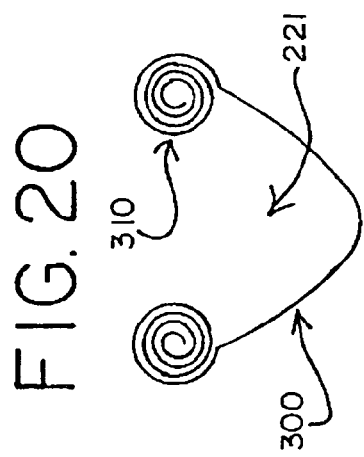

SYSTEM AND/OR METHOD FOR READING, MEASURING AND/OR CONTROLLING INTENSITY OF LIGHT EMITTED FROM AN LED

This application is a continuation-in-part application of U.S. Non-Provisional application Ser. No. 12/592,614, filed Nov. 30, 2009, now U.S. Pat. No. 7,935,916 which is a continuation application of U.S. Non-Provisional application Ser. No. 11/975,777, filed Oct. 22, 2007, now U.S. Pat. No. 7,626,153.

BACKGROUND OF THE INVENTION

The present invention generally relates to a system and/or a method for reading, measuring and/or controlling intensity of light emitted from a light-emitting diode (LED). More specifically, the present invention relates to a system and/or a method that may have a light detector located in a position adjacent to the LED for reading and/or measuring the intensity of light emitted from the LED. A cavity may house the LED and/or the light detector, and/or the cavity may have an aperture through which the LED may emit light.

It is generally known that an LED is a semiconductor diode that has a chip of semiconducting material doped with impurities to create a p-n junction. The semiconductor diode emits light when the same is electrically biased in a forward direction of the p-n junction. The emitted light may be, for example, infrared light, visible light and/or near ultraviolet light. Further, the color of the emitted light varies depending on the semiconducting material used. Additionally, optics are added to the chip to shape a radiation pattern of the emitted light.

Further, it is generally known that an intensity of the emitted light varies over time. The intensity of the emitted light may be controlled by varying a voltage and/or a current of electricity applied to the LED. Therefore, control systems are provided to measure intensity of emitted light and to control the voltage and/or the current applied to the LED to produce a more stable intensity of emitted light over time.

However, the LED is often used in open systems where the LED may be exposed to ambient light. The ambient light may be emitted from light sources external to the LED. The ambient light may be light emitted from the LED that has been reflected from a surface located adjacent to the LED. It is generally known that ambient light is absorbed and/or reflected by the LED and/or the semiconducting material. Absorption of the ambient light by the semiconducting material alters the properties of the semiconducting material and contributes to the varying intensity of emitted light. Moreover, ambient light is often passively detected by the control systems. Therefore, known control systems measure intensity of emitted light and, inadvertently, ambient light to control the voltage and/or the current applied to the LED. As a result, the intensity of light emitted from the LED used with known control systems varies substantially over time even when used in conjunction with known control systems designed to prevent the same.

A need, therefore, exists for a system and/or a method for reading, measuring and/or controlling intensity of light emitted from an LED. Additionally, a need exists for a system and/or a method that may prevent and/or may retard reflection of ambient light from a surface of the LED to allow an accurate reading and/or an accurate measurement of the intensity of light emitted from the LED. Further, a need exists for a system and/or a method that may prevent absorption of ambient light by a semiconducting material of the LED to control intensity of light emitted from the LED. Still further, a need exists for a light detector that may be exposed only to light emitted by the LED. Still further, a need exists for a control circuit that may be electrically connected to both the light detector and the LED for measuring and/or for controlling intensity of light emitted from the LED. Moreover, a need exists for a cavity that may surround the light detector to limit exposure of the light detector to ambient light.

SUMMARY OF THE INVENTION

The present invention generally relates to a system and/or a method for reading, measuring and/or controlling intensity of light emitted from a light-emitting diode (LED). More specifically, the present invention relates to a system and/or a method that may have a light detector located in a position adjacent to the LED for reading and/or measuring the intensity of light emitted from the LED. The LED and the light detector may be located in a cavity which may limit exposure of the LED and the light detector to ambient light. The cavity may have an aperture for allowing light emitted from the LED to exit the chamber to illuminate an environment in which the chamber is located. Further, the cavity may limit exposure of the LED and/or the light detector to ambient light that may enter the cavity through the aperture.

The aperture may be located between the cavity and a compartment, and the LED may emit light through the aperture into the compartment. An additional detector may be located in the compartment and/or may extend from the cavity through an additional aperture into the compartment. The intensity of light in the compartment measured by the detector may be used to determine the volume of the compartment, a position of a movable element within the compartment and/or a velocity of a movable element within the compartment.

To this end, in an embodiment of the present invention, a system for controlling light emitted from a light source is provided. The system has a compartment having ambient light wherein one end of the compartment is defined by a platform; and an aperture in the platform. Further, the system has a cap having a first end and a second end wherein the second end is located in a position opposite to the first end and further wherein the first end of the cap is connected to the platform. Still further, the system has a cavity in the cap wherein the platform and the aperture are located between the cavity and the compartment; and an LED that emits light wherein the LED is located in the cavity and further wherein the light emitted from the LED has an intensity wherein the LED has an emitting surface to transmit the light emitted from the LED. Still further, the system has a first detector located in the cavity wherein the platform is located between the compartment and the first detector and further wherein the first detector is adjacent to the LED to detect the intensity of the light emitted directly from the emitting surface of the LED. Moreover, the system has and a control circuit for monitoring the intensity of the light detected by the first detector wherein the control circuit is electrically connected to the first detector and the LED wherein the control circuit regulates the intensity of light emitted by the LED.

In an embodiment, the system has a finish on the emitting surface of the LED which retards reflection of the ambient light wherein the finish on the emitting surface enables the light emitted from the LED to travel through the finish and into the environment.

In an embodiment, the system has a second detector located in the compartment wherein the second detector measures the intensity of light in the compartment.

In an embodiment, the system has fingers located in the cavity wherein the fingers connect the LED to the platform.

In an embodiment, the system has a mirrored surface in the compartment that reflects the light emitted from the LED.

In an embodiment, the platform is substantially flat, and the platform is a printed circuit board.

In an embodiment, the system has a member that extends from the second end of the cavity to a position between the aperture and the second end of the cavity wherein the first detector is mechanically connected to the member and further wherein the member aligns the first detector with the aperture.

In an embodiment, the system has a support located in the cavity wherein the support is connected to the platform and further wherein the LED is connected to the support wherein the support aligns the LED with the aperture and maintains a distance of the LED from the aperture.

In another embodiment of the present invention, a system for reading light emitted from a light source is provided. The system has a compartment having ambient light wherein the compartment has a platform which forms one end of the compartment; an aperture in the platform; and a cavity located on an opposite side of the platform relative to the compartment wherein the aperture is located between the compartment and the cavity. Further, the system has an LED to emit light from the cavity through the aperture into the compartment wherein the light emitted from the LED has an intensity and further wherein the LED is located in the cavity. Still further, the system has a first detector adjacent to the LED to detect the intensity of light emitted directly from the LED. Moreover, the system has a second detector which extends into the compartment wherein the second detector measures the intensity of light in the compartment.

In an embodiment, the system has a control circuit for monitoring the intensity of light detected by the first detector wherein the control circuit is electrically connected to the first detector and the LED and further wherein the control circuit regulates the intensity of light.

In an embodiment, the system has a lens sized to fit into the aperture wherein the lens focuses the light emitted from the LED through the aperture to the compartment and further wherein the lens focuses the ambient light into the cavity.

In an embodiment, the system has fingers located in the cavity wherein the fingers connect the LED to the platform adjacent to the aperture.

In an embodiment, the system has a support located in the cavity wherein the support is connected to the platform and further wherein the LED is connected to the support wherein the support aligns the LED with the aperture and maintains a distance of the LED from the aperture.

In an embodiment, the system has a support located in the cavity wherein the support is connected to the platform and further wherein the LED and the first detector are connected to the support wherein the support aligns the LED with the aperture and maintains a distance of the LED from the aperture and further wherein the support maintains a position of the first detector.

In an embodiment, the system has an additional aperture in the platform wherein the second detector is partially located in the cavity and further wherein the second detector extends from the cavity through the additional aperture into the compartment.

In an embodiment, the second detector is mechanically connected to the platform, and the platform is located between the first detector and the second detector.

In another embodiment of the present invention, a method for controlling light emitted from a light source is provided. The method has the step of emitting light from an LED into a compartment having a platform which has an aperture wherein the LED and a first light intensity detector are located in a cavity and further wherein the platform and the aperture are located between the cavity and the compartment wherein the light emitted from the LED travels through the aperture and further wherein a second light intensity detector is located in the compartment. Further, the method has the step of obtaining measurements of an intensity of the light emitted from the LED onto the first light intensity detector. Still further, the method has the step of adjusting the intensity of the light emitted from the LED in response to the measurements. Moreover, the method has the step of determining an intensity of light in the compartment using the second light intensity detector.

In an embodiment, the method has the step of adjusting the intensity of the light emitted from the LED using a control circuit which is electrically connected to the first light intensity detector and the LED.

In an embodiment, the method has the step of retarding reflection of the ambient light from the LED using a finish on the LED wherein the finish allows the light emitted from the LED to travel through the finish and into the compartment.

In an embodiment, the method has the step of aligning the LED with the aperture and maintaining a distance of the LED from the aperture using a support connected to the platform wherein the support is located in the cavity and further wherein the LED is connected to the support.

It is, therefore, an advantage of the present invention to provide a system and/or a method for reading, measuring and/or controlling intensity of light emitted from an LED.

Another advantage of the present invention is to provide a system and/or a method for reading, measuring and/or controlling intensity of light emitted from an LED that may allow an accurate reading and/or an accurate measurement of the intensity of light emitted from the LED.

And, another advantage of the present invention is to provide a system and/or a method for reading, measuring and/or controlling intensity of light emitted from an LED that may have a light detector located in a position adjacent to the LED for reading and/or measuring the intensity of light emitted from the LED.

Yet another advantage of the present invention is to provide a system and/or a method for reading, measuring and/or controlling intensity of light emitted from an LED that may have a control circuit that may be electrically connected to both the detector and the LED for measuring and/or controlling intensity of light emitted from the LED.

And, another advantage of the present invention is to provide a system and/or a method for reading, measuring and/or controlling intensity of light emitted from an LED that may limit and/or may prevent exposure of the light detector to ambient light and/or infrared light that may not be emitted directly from the LED to the light detector.

Yet another advantage of the present invention is to provide a system and/or a method for reading, measuring and/or controlling intensity of light emitted from an LED that may prevent and/or may retard reflection of ambient light from a surface of the LED to allow an accurate reading and/or an accurate measurement of the intensity of light emitted from the LED.

Another advantage of the present invention is to provide a system and/or a method for reading, measuring and/or controlling intensity of light emitted from an LED that may prevent absorption of ambient light by a semiconducting material of the LED to better control intensity of light emitted from the LED.

Yet another advantage of the present invention is to provide a system and/or a method for reading, measuring and/or controlling intensity of light emitted from an LED wherein an emitting surface of the LED retards reflection of ambient light from the emitting surface and/or limits exposure of internal components of the LED to ambient light.

A still further advantage of the present invention is to provide a system and/or a method for reading, measuring and/or controlling intensity of light emitted from an LED wherein the light detector and the LED may both be located in a cavity designed to limit exposure of both the LED and the light detector to ambient light.

Moreover, an advantage of the present invention is to provide a system and/or a method for reading, measuring and/or controlling intensity of light emitted from an LED that may have a cavity for the LED and a light detector that may have an aperture for allowing light emitted from the LED to exit the chamber to illuminate an environment in which the chamber is located.

And, another advantage of the present invention is to provide a system and/or a method for reading, measuring and/or controlling intensity of light emitted from an LED that may have a cavity for housing the LED and a light detector that limits exposure of the LED and/or the light detector to ambient light that may enter the cavity via an aperture in the chamber.

Yet another advantage of the present invention is to provide a system and/or a method for reading, measuring and/or controlling intensity of light emitted from an LED that may have a surface to reflect light emitted from the LED away from a detector and/or to illuminate an environment that is not directly opposite from the emitting surface of the LED.

Moreover, an advantage of the present invention is to provide a system and/or a method for reading, measuring and/or controlling intensity of light emitted from an LED that may maintain a generally uniform and/or constant intensity of light emitted from the LED.

And, another advantage of the present invention is to provide a system and/or a method for reading, measuring and/or controlling intensity of light emitted from an LED that may produce high resolution light.

Yet another advantage of the present invention is to provide a system and/or a method for reading, measuring and/or controlling intensity of light emitted from an LED that may have applications in smoke detectors, control systems for pneumatic cylinders, bar code scanning technologies and/or the like.

Additional features and advantages of the present invention are described in, and will be apparent from, the detailed description of the presently preferred embodiments and from the drawings.

BRIEF DESCRIPTION OF THE DRAWINGS

FIG. 1 illustrates a top view of a system for reading, measuring and/or controlling intensity of light emitted from an LED in an embodiment of the present invention.

FIG. 2 illustrates a cross-sectional view taken generally along line I-I of FIG. 1 of a system for reading, measuring and/or controlling intensity of light emitted from an LED in an embodiment of the present invention.

FIG. 3A illustrates a top view of a system for reading, measuring and/or controlling intensity of light emitted from an LED in an embodiment of the present invention.

FIG. 3B illustrates a cross-sectional view taken generally along line IIIa-IIIc of FIG. 3A of a system for reading, measuring and/or controlling intensity of light emitted from an LED in an embodiment of the present invention.

FIG. 4 illustrates a top view of a system for reading, measuring and/or controlling intensity of light emitted from an LED in an embodiment of the present invention.

FIG. 5 illustrates a cross-sectional view taken generally along line IV-IV of FIG. 4 of a system for reading, measuring and/or controlling intensity of light emitted from an LED in an embodiment of the present invention.

FIG. 6 illustrates a top view of a system for reading, measuring and/or controlling intensity of light emitted from an LED in an embodiment of the present invention.

FIG. 7 illustrates a cross-sectional view taken generally along line VI-VI of FIG. 6 of a system for reading, measuring and/or controlling intensity of light emitted from an LED in an embodiment of the present invention.

FIG. 8 illustrates a top view of a system for reading, measuring and/or controlling intensity of light emitted from an LED in an embodiment of the present invention.

FIG. 9 illustrates a cross-sectional view taken generally along line VIII-VIII of FIG. 8 of a system for reading, measuring and/or controlling intensity of light emitted from an LED in an embodiment of the present invention.

FIG. 10 illustrates a black box diagram of a system for reading, measuring and/or controlling intensity of light emitted from an LED in an embodiment of the present invention.

FIG. 11 illustrates a top view of a system for reading, measuring and/or controlling intensity of light emitted from an LED in an embodiment of the present invention.

FIG. 12 illustrates a cross-sectional view taken generally along line X-X of FIG. 11 of a system for reading, measuring and/or controlling intensity of light emitted from an LED in an embodiment of the present invention.

FIG. 13 illustrates a top view of a system for reading, measuring and/or controlling intensity of light emitted from an LED in an embodiment of the present invention.

FIG. 14 illustrates a cross-sectional view taken generally along line XII-XII of FIG. 13 of a system for reading, measuring and/or controlling intensity of light emitted from an LED in an embodiment of the present invention.

FIG. 15 illustrates a top view of a system for reading, measuring and/or controlling intensity of light emitted from an LED in an embodiment of the present invention.

FIG. 16 illustrates a cross-sectional view taken generally along line XIV-XIV of FIG. 15 of a system for reading, measuring and/or controlling intensity of light emitted from an LED in an embodiment of the present invention.

FIG. 17 illustrates a top view of a system for reading, measuring and/or controlling intensity of light emitted from an LED in an embodiment of the present invention.

FIG. 18 illustrates a cross-sectional view taken generally along line XVI-XVI of FIG. 17 of a system for reading, measuring and/or controlling intensity of light emitted from an LED in an embodiment of the present invention.

FIG. 19 illustrates a top view of a mirrored spring in an embodiment of the present invention.

FIG. 20 illustrates a side view of a mirrored spring in an embodiment of the present invention.

FIG. 21 illustrates a top view of mirrored nesting rings in an embodiment of the present invention.

FIG. 22 illustrates a side view of mirrored nesting rings in an embodiment of the present invention.

FIG. 23 illustrates a top view of a mirrored spiral in an embodiment of the present invention.

FIG. 24 illustrates a side view of a mirrored spiral in an embodiment of the present invention.

DETAILED DESCRIPTION OF THE PRESENTLY PREFERRED EMBODIMENTS

Figure 25:
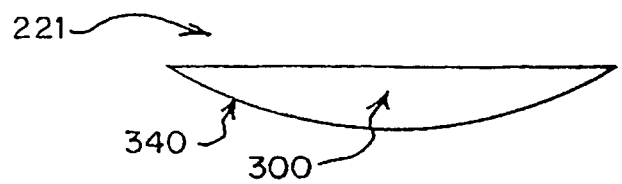
FIG. 25 illustrates a side view of a target in an embodiment of the present invention.

The present invention generally relates to a system and/or a method for reading, measuring and/or controlling intensity of light emitted from a light-emitting diode (LED). More specifically, the present invention relates to a system and/or a method that may have a light detector located in a position adjacent to the LED for reading and/or measuring the intensity of light emitted from the LED. The LED and the light detector may be located in a cavity which may limit exposure of the LED and the light detector to ambient light. The cavity may have an aperture for allowing light emitted from the LED to exit the chamber to illuminate an environment in which the chamber is located. Further, the cavity may limit exposure of the LED and/or the light detector to ambient light that may enter the cavity through the aperture.

The aperture may be located between the cavity and a compartment, and the LED may emit light through the aperture into the compartment. An additional detector may be located in the compartment and/or may extend from the cavity through an additional aperture into the compartment. The intensity of light in the compartment measured by the detector may be used to determine the volume of the compartment, a position of a movable element within the compartment and/or a velocity of a movable element within the compartment.

A control circuit may be connected to both the detector and the LED for measuring and/or controlling intensity of light emitted from the LED. The control circuit may monitor the intensity of the light emitted from the LED that may be read and/or measured by the light detector. As a result, the control circuit may use a negative feedback loop mechanism to regulate a voltage and/or a current of electricity applied to the LED to control the intensity of light emitted from the LED.

Referring now to the drawings wherein like numerals refer to like parts, FIGS. 1, 2, 3A, 3B, 4-9 and 11-18 illustrate systems 20, 40, 60, 80, 100, 120, 140, 160, 180, 200 for reading, measuring and/or controlling intensity of light emitted from an LED 2 in embodiments of the present invention. In an embodiment, the LED 2 may have optics for shaping a radiation pattern of the LED from an emitting surface 3 of the LED 2. The LED 2 may emit one or more colors of light, for example, blue light, red light, green light, white light and/or the like. The LED 2 may emit one or more types of light such as, for example, infrared light, visible light, ultraviolet light and/or the like. The present invention should not be deemed as limited to a specific embodiment of the LED 2. It should be understood that the LED 2 may be any LED as known to one having ordinary skill in the art.

In an embodiment, the emitting surface 3 of the LED 2 may have one or more finishes 5a and/or coatings 5b that may absorb ambient light and/or may prevent and/or may retard reflection of ambient light from the emitting surface 3 of the LED 2. The finishes 5a and/or the coatings 5b may be, for example, matte finishes and/or coatings that may allow light to escape the emitting surface 3 while preventing and/or retarding ambient light from entering and/or being reflected by the emitting surface 3. The finishes 5a and/or the coatings 5b may effectively absorb ambient light on the emitting surface 3 of the LED 2. The finishes 5a and/or the coatings 5b may be produced by mechanically abrading and/or chemically altering the emitting surface 3 of the LED 2. In an embodiment the finishes 5a and/or the coatings 5b may be one or more filters and/or chemicals placed over the emitting surface 3 of the LED 2. The present invention should not be deemed as limited to a specific embodiment of the finishes 5a and/or the coatings 5b. It should be understood that the finishes 5a and/or coatings 5b may be any finishes and/or coatings for absorbing ambient light and/or preventing and/or retarding reflection of ambient light as known to one having ordinary skill in the art.

Further, FIGS. 1, 2, 3A, 3B and 4-19 generally illustrate a detector 4 that may be, for example, a light intensity detector, a photodiode, a phototransistor and/or other like detector that may output a current and/or a voltage as a function of light intensity detected. The detector 4 may read and/or may measure an intensity of light emitted from the LED 2. As shown in FIG. 10, the detector 4 may be electrically connected to a control circuit 122 with an electrical connection 8. The electrical connection 8 may be any electrically conductive connection, such as, for example, one or more wires, leads, solder joints and/or the like. The present invention should not be deemed as limited to a specific embodiment of the detector 4. It should be understood that the detector 4 may be any detector for reading and/or measuring light intensity as known to one having ordinary skill in the art.

As shown in FIG. 10, the control circuit 122 may be electrically connected to the LED 2 with an electrical connection 10. The electrical connection 10 may be any electrically conductive connection, such as, for example, one or more wires, leads, solder joints and/or the like. The control circuit 122 may be electrically connected to a power source 124, such as, for example, a battery, an electrical grid and/or the like. The control circuit 122 may provide power to the LED 2 and/or to the detector 4. The control circuit 122 may be, for example, an analog circuit, a digital circuit and/or the like. The control circuit 122 may determine an intensity of light 1 emitted from the LED 2 by monitoring a voltage and/or a current produced by the detector 4 in response to an absorption of light 1 by the detector 4. The control circuit 122 may instantaneously change a voltage and/or a current applied to the LED 2 to regulate the intensity of light 1 emitted from the LED 2. The control circuit 122 may be used to regulate the intensity of light 1 emitted from the LED to be substantially uniform and/or stable over a period of time. The present invention should not be deemed as limited to a specific embodiment of the control circuit 122. It should be understood that the control circuit 122 may be any control circuit for measuring light intensity and/or regulating voltage and/or current applied to an LED as known to one having ordinary skill in the art.

FIGS. 1, 2, 3A, 3B, 5, 7, 9, 12, 14, 16 and 18 generally illustrate a platform 6 for securing the LED 2, the detector 4 and/or one or more components of the systems 20, 40, 60, 80, 100, 120, 140, 160, 180, 200. The platform 6 may be, for example, a printed circuit board, a plastic surface, a metal surface and/or the like. The platform 6 may provide an electrical connection 8 and/or an electrical connection 10 for the detector 4 and/or the LED 2, respectively. The platform 6 may be any surface capable of holding the LED 2, the detector 4 and/or one or more components of the systems 20, 40, 60, 80, 100, 120, 140, 160, 180, 200. The platform 6 may be a surface of an environment in which the systems 20, 40, 60, 60, 100, 120, 140, 160, 180, 200 may be situated. The present invention should not be deemed as limited to a specific embodiment of the platform 6. It should be understood that the platform 6 may be any surface as known to one having ordinary skill in the art.

In an embodiment as illustrated in FIGS. 1 and 2, the system 20 may have a tower 22. The tower 22 may have a perimeter 28 defining an external surface 29. Further, the tower 22 may have a height defined between a top end 30 and a bottom end 32. The bottom end 32 may be located in a position generally opposite to the top end 30. In an embodiment, the tower 22 may be generally cylindrical. In an embodiment, the tower 22 may be constructed from an opaque material, such as, for example, metal, plastic and/or the like. In an embodiment, the tower 22 may have a compartment 26 that may be located entirely within the perimeter 28 of the tower 22.

The detector 4 may be situated within the compartment 26. The compartment 26 may have a perimeter 34 that may surround the detector 4. Further, the compartment 26 may have a height defined between a top side 36 and a bottom side 38 located in a position generally opposite to the top side 36. The tower 22 and/or the compartment 26 may be a housing for holding the detector 4. The tower 22 and/or the compartment 26 may prevent the detector 4 from being exposed to ambient light located outside the perimeters 28, 34. Further, the tower 22 and/or the compartment 26 may prevent the detector 4 from being exposed to infrared light. Moreover, the tower 22 may be mounted upright on the platform 6. The present invention should not be deemed as limited to a specific embodiment of the tower 22 and/or the compartment 26. It should be understood that the tower 22 and/or the compartment 26 may be any shape and/or material that may house the detector 4 as known to one having ordinary skill in the art.

In an embodiment, the tower 22 and/or the compartment 26 may be milled from the opaque material. In another embodiment, the tower 22 and/or the compartment 26 may be formed by drilling, melting, machining, extruding and/or molding the opaque material.

As shown in FIGS. 1 and 2, the tower 22 may have a channel 24 that may extend at an angle from the external surface 29 of the tower 22 to the compartment 26. In an embodiment, the channel 24 may extend at the angle from the bottom end 32 of the tower 22 towards the top end 30 of the tower 22. As shown in FIGS. 1 and 2, the channel 24 may be tubular in shape and may have a diameter. The channel 24 may be sized to allow a readable amount of light 1 to reach the detector 4. The channel 24 may be, for example, a drilled hole in the tower 22. In an embodiment, the LED 2 may be mounted upright on the platform 6 and may be situated adjacent to the tower 22. The light 1 emitted from the emitting surface 3 of the LED 2 may travel through the channel 24 and may be read and/or measured by the detector 4 situated in the compartment 26 of the tower 22. The system 20 may be situated in an environment containing ambient light emitted from the LED 2, containing ambient light emitted and/or reflected from other sources, and/or containing infrared light. The angle of the channel 24 with respect to the emitting surface 3 of LED 2 and/or the position of the tower 22 may reduce and/or may prevent exposure of the detector to ambient light and/or infrared light via the channel 24. Further, one or more of the finishes 5a and/or the coatings 5b of the emitting surface 3 of the LED 2 may absorb ambient light and/or may prevent and/or may retard reflection of ambient light into the channel 24. As a result, the detector 4 may accurately read and/or detect the intensity of the light 1 emitted by the LED 2.

In an embodiment, as illustrated in FIGS. 3A and 3B, the system 40 may have a tower 42. The tower 42 may have a perimeter 48 defining an external surface 49. Further, the tower may have a height defined between a top end 50 and a bottom end 52 that may be located in a position generally opposite to the top end 50. The tower 42 may have a compartment 46 that may be located entirely within the perimeter 48 of the tower 42.

The compartment 46 may have may have a height defined between a top side 56 and a bottom side 58 that may be located in a position generally opposite to the top side 56. The compartment 46 may have a perimeter 54. The detector 4 may be situated within the tower 42 and/or the compartment 46. The tower 42, and/or the compartment 46 may prevent the detector 4 from being exposed to ambient light and/or infrared light located outside of the perimeters 48, 54. The present invention should not be deemed as limited to a specific embodiment of the tower 42 and/or the compartment 46. It should be understood that the tower 42 and/or the compartment 46 may be any shape and/or material that may prevent exposure of the detector 4 to ambient light and/or infrared light as known to one having ordinary skill in the art.

As shown in FIGS. 3A and 3B, the tower 42 may have a tube 44 that may extend at an angle from the compartment 46 of the tower 42 to a position adjacent to and external to the tower 42. The tube 44 may have a length defined between a first end 43 and a second end 45 that may be located in a position generally opposite to the second end. In an embodiment, the tube 44 may extend at an angle from the top end 50 of the tower 42 towards the platform 6 and/or the LED 2. As shown in FIGS. 3A and 3B, the tube 44 may be tubular in shape and may have a diameter. The tube 44 may be sized to allow a readable amount of light 1 to reach the detector 4. The tube 44 may be, for example, a pipe and/or other like member that may allow the light 1 to enter and/or leave the first end 43 and/or the second end 45. The tube 44 may prevent ambient light and/or infrared light from entering the tube 44 between the first end 43 and the second end 45. In an embodiment, the LED 2 may be mounted upright on the platform 6 and may be situated adjacent to the tower 42. The light 1 emitted from the emitting surface 3 of the LED 2 may travel through the tube 44 and may be read and/or measured by the detector 4 that may be situated in the compartment 46 of the tower 42.

The system 40 may be situated in an environment containing ambient light emitted from the LED 2, containing ambient light emitted and/or reflected from other sources, and/or containing infrared light. The angle of the tube 44 with respect to the emitting surface 3 of the LED 2 and/or the position of the tower 42 may reduce and/or may prevent exposure of the detector 4 to ambient light and/or infrared light via the tube 44. Further, one or more of the finishes 5a and/or the coatings 5b of the emitting surface 3 of the LED 2 may absorb ambient light and/or may prevent and/or may retard reflection of ambient light into the tube 44. As a result, the detector 4 may accurately read and/or detect the intensity of the light 1 emitted by the LED 2 through the tube 44.

In an embodiment, as illustrated in FIGS. 4 and 5, the system 60 may have a tower 62. The tower 62 may have a length defined between a back surface 72 and a front surface 74 that may be located in a position generally non-parallel to the back surface 72. The tower 62 may have a width defined between a first end 68 and a second end 70 that may be located in a position generally opposite to the first end 68. In an embodiment, a profile of the tower 62 may be generally triangular. In an embodiment, the front surface 74 may be a mirror and/or other like surface capable of reflecting light. In an embodiment, the tower 62 may have a compartment 66 that may be located entirely between the front surface 74 and the back surface 72 and between the first end 68 and the second end 70 of the tower 62. The compartment 66 may have a perimeter 67. The detector 4 may be situated within the tower 62 and/or the compartment 66. The tower 62 and/or the compartment 66 may prevent the detector 4 from being exposed to ambient light outside of the perimeter 67 and/or infrared light. The present invention should not be deemed as limited to a specific embodiment of the tower 62 and/or the compartment 66. It should be understood that the tower 62 and/or the compartment 66 may be any shape and/or material that may house the detector 4 as known to one having ordinary skill in the art. Moreover, the front surface 74 of the tower 62 may be any surface capable of reflecting light and/or infrared light as known to one having ordinary skill in the art.

As shown in FIGS. 4 and 5, the tower 62 may have a channel 64 that may extend generally parallel to the platform 6 from the front surface 74 of the tower 62 to the compartment 66. As shown in FIGS. 4 and 5, the channel 64 may be tubular in shape and may have a diameter. The channel 64 may be sized to allow a readable amount of the light 1 to reach the detector 4. The channel 64 may be, for example, a drilled hole in the tower 62. In an embodiment, the LED 2 may be mounted sideways on the platform 6 and may be situated adjacent to the tower 62. The emitting surface 3 of the LED 2 may be directed at the front surface 74 and/or may be generally parallel to the back surface 72. The light 1 emitted from the emitting surface 3 of the LED 2 may travel through the channel 64 and may be read and/or measured by the detector 4 that may be situated in the compartment 66 of the tower 62. Additional light 1 emitted by the LED 2 may be reflected by the front surface 74 away from the tower 62 and/or the LED 2. An angle of reflection may depend on an angle of the front surface 74 with respect to the emitting surface 3 of the LED 2. In an embodiment, the angle of the front surface with respect to the emitting surface 3 may be, for example, forty-five (45) degrees which may reflect the additional light outward with respect to the platform 6.

The system 60 may be situated in an environment containing ambient light emitted from the LED 2 and/or containing ambient light and/or infrared light emitted and/or reflected from other sources. A position of the LED 2 with respect to the front surface 74 of the tower 62 may reduce and/or may prevent exposure of the detector 4 to ambient light and/or infrared light via the channel 64. Further, one or more of the finishes 5a and/or the coatings 5b of the emitting surface 3 of the LED 2 may absorb ambient light and/or may prevent and/or may retard reflection of ambient light into the channel 64. As a result, the detector 4 may accurately read and/or detect the intensity of the light 1 emitted by the LED 2 through the channel 64.

In an embodiment, as illustrated in FIGS. 6 and 7, the system 80 may have a chamber 82. The chamber 82 may have a perimeter 84 defining an external surface 85. Further, the chamber 82 may have a height defined between a top end 96 and a bottom end 98 that may be located in a position generally opposite to the top end 96. In an embodiment, the chamber 82 may be generally cylindrical. In an embodiment, the top end 96 of the chamber 82 may have an aperture 99 for allowing ambient light into the chamber 82. The aperture 99 may be generally round. In embodiment, the chamber 82 may have a lens 90 sized to fit inside and may cover the aperture 99. The lens 90 may be, for example, a ball lens. The chamber 82 may have a compartment 86 that may be located entirely within the perimeter 84 of the chamber 82. The compartment 86 may have a perimeter 88 that may surround the detector 4 and one or more of the LEDs 2. The chamber 82 and/or the compartment 86 may be a housing for holding the detector 4, one or more LEDs 2 and/or a member 92. The member 92 may extend from the platform 6 to a position between the aperture 99 and the bottom end 98 of the chamber 82. The member 92 may have a top surface 94 that may be substantially parallel to the aperture 99 and/or the lens 90. The top surface 94 of the member 92 may be designed to absorb light and/or to reflect light entering the chamber 82 through the lens 90. In an embodiment, the member 92 may be, for example, a flathead screw that may be painted black. The chamber 82, the compartment 86, the lens 99 and/or the member 92 may prevent the detector 4 from being exposed to ambient light and/or infrared light outside of the perimeters 84, 88. Moreover, the chamber 82 and/or the LEDs 2 may be mounted upright on the platform 6. The present invention should not be deemed as limited to a specific embodiment of the chamber 82, the compartment 86, the aperture 99, the lens 90 and/or the member 92. It should be understood that the chamber 82, the compartment 86, the aperture 99, the lens 90 and/or the member 92 may be any chamber, compartment, aperture, lens and/or member, respectively, as known to one having ordinary skill in the art.

As shown in FIGS. 6 and 7, the LEDs 2 may be mounted upright on the platform 6 and may be situated adjacent to the perimeter 88 of the compartment 86. The light 1 emitted from the emitting surface 3 of the LEDs 2 may travel and/or may be reflected around the chamber 82. The light 1 emitted from the emitting surface may be focused by the lens 90 and may be transmitted outside of the chamber 82 to a focal point outside of the chamber 82. Further, the light 1 emitted from the LEDs 2 may be read, measured and/or detected by the detector 4 situated in a position adjacent to the LEDs within the compartment 86 of the chamber 82.

The system 80 may be situated in an environment containing ambient light emitted from the LEDs 2 and/or containing ambient light emitted and/or reflected from other sources. Ambient light outside of the chamber 82 may be focused by the lens 90 onto the top surface 94 of the member 92. The top surface 94 of the member 92 may absorb the focused light and/or may reflect the focused light towards the lens 90. Further, one or more of the finishes 5a and/or the coatings 5b of the emitting surface 3 of the LEDs 2 may absorb excess ambient light and/or may prevent and/or may retard reflection of excess ambient light in a direction towards the detector 4. Further, the light 1 emitted from the LEDs 2 may be focused by the lens 90 outside of the chamber 82 to illuminate the environment. In an embodiment, the system 80 may have an ambient light detector 81 that may detect the intensity of ambient light in the environment outside of the chamber 82.

In an embodiment, as illustrated in FIGS. 8 and 9, the system 100 may have a chamber 102. The chamber 102 may have a perimeter 104 defining an external surface 105. Further, the chamber 102 may have a height defined between a top end 114 and a bottom end 116 that may be located in a position generally opposite to the top end 114. In an embodiment, the top end 114 of the chamber 102 may have a channel 110 to allow ambient light into the chamber 102. In an embodiment, the channel 110 may be generally tubular in shape.

In an embodiment, the chamber 102 may have a compartment 106 having a perimeter 108 that may be located entirely within the perimeter 104 of the chamber 102. The chamber 102 and/or the compartment 106 may be a housing for holding the detector 4, the LED 2 and/or a member 112. The member 112 may extend from the perimeter 108 of the compartment 106 to a position between the channel 102 and the bottom end 116 of the chamber 102. The member 112 may have a top surface 113 that may be substantially parallel to the top end 114 of the chamber 102. The top surface 113 of the member 112 may be designed to absorb light and/or to reflect light entering the chamber 102 through the channel 110. The chamber 102, the compartment 106, and/or the member 112 may prevent the detector 4 from being exposed to ambient light and/or infrared light outside of the perimeters 104, 108. The present invention should not be deemed as limited to a specific embodiment of the chamber 102, the compartment 106, the channel 110, and/or the member 112. It should be understood that the chamber 102, the compartment 106, the channel 110 and/or the member 112 may be any chamber, compartment, channel and/or member, respectively, as known to one having ordinary skill in the art.

As shown in FIGS. 8 and 9, the LED 2 may be mounted upright on the platform 6 and may be situated adjacent to the perimeter 108 of the compartment 106. The light 1 emitted from the emitting surface 3 of the LED 2 may escape the chamber 102 through the channel 110. Further, the light 1 emitted from the LED 2 may be read, measured and/or detected by the detector 4 situated in a position adjacent to the LED 2 within the compartment 106 of the chamber 102.

Ambient light and/or infrared light outside of the chamber 102 may enter the chamber 102. The top surface 113 of the member 112 may absorb the ambient light and/or the infrared light and/or may reflect the ambient light and/or the infrared light towards and/or out of the chamber 102 through the channel 110. Further, one or more of the finishes 5a and/or the coatings 5b of the emitting surface 3 of the LED 2 may absorb excess ambient light and/or may prevent and/or may retard reflection of excess ambient light in a direction towards the detector 4.

As generally illustrated in FIGS. 11-18 and 27, the systems 140, 160, 180, 200 may have a cap 190 which may be connected to the platform 6, and the cap 190 may contain a cavity 195. The cavity 195 may have a perimeter 196. In an embodiment, the cap 190 and/or the cavity 195 may be generally cylindrical in shape, and/or the perimeter 196 may be generally circular in shape. The detector 4 and/or the LED 2 may be located within the cavity 195. The cavity 195 may have a height defined between a top end 214 and a bottom end 216, and the bottom end 216 may be located in a position generally opposite to the top end 214.

The LED 2 may be suspended from the platform 6 and/or the top end 214 of the cavity 200. The platform 6 and/or the top end 214 of the cavity 195 may have an aperture 210 to allow ambient light to enter the cavity 195 and to allow the light 1 emitted from the emitting surface 3 of the LED 2 to exit the cavity 195. In an embodiment, the aperture 210 may be generally round in shape. A lens 290 may cover the aperture 210. In an embodiment, the lens 290 may be at least partially located within the aperture 210. The lens 290 may be, for example, a ball lens. The lens 290 may enable ambient light to enter the cavity 195 and may enable the light 1 emitted from the emitting surface 3 of the LED 2 to exit the cavity 195. The present invention is not limited to a specific embodiment of the cavity 195, the aperture 210 or the lens 290.

As generally illustrated in FIGS. 11 and 12, the LED 2 may be suspended from the platform 6 and/or the top end 214 of the cavity 195 by fingers 201 which may extend from the LED 2. In an embodiment, the fingers 201 may be integral with the LED 2. The fingers 201 may suspend the LED 2 in a position adjacent to the aperture 210 and/or may align the LED 2 with the aperture 210. The fingers 201 may maintain a distance 202 from the LED 2 to the aperture 210. For example, in an embodiment, the distance 202 may be 0.07 inches. However, the present invention is not limited to a specific embodiment of the distance 202. The detector 4 may be mechanically connected to the platform 6 and/or the top end 214 of the cavity 195. For example, the detector 4 may be directly connected to the platform 6 and/or the top end 214 of the cavity 195.

As generally illustrated in FIGS. 13 and 14, the system 160 may have a support 250 suspended from the platform 6 and/or the top end 214 of the cavity 195. The support 250 may secure the LED 2. For example, the LED 2 may be directly connected to the support 250. The support 250 may be, for example, a printed circuit board, a plastic surface, a metal surface and/or the like. The support 250 may suspend the LED 2 in a position adjacent to the aperture 210 and/or may align the LED 2 with the aperture 210. As generally illustrated in FIGS. 15 and 16, the support 250 may secure both the LED 2 and the detector 4. For example, both the LED 2 and the detector 4 may be connected to the support 250. The support 250 may suspend the LED 2 in a position adjacent to the aperture 210 and/or may align the LED 2 with the aperture 210, and/or the support 250 may position the detector 4 adjacent to the LED 2.

The support 250 may maintain the distance 202 from the LED 2 to the aperture 210. For example, in an embodiment, the distance 202 may be 0.07 inches. However, the present invention is not limited to a specific embodiment of the distance 209. Moreover, the present invention is not limited to a specific embodiment of the support 250.

Referring to FIGS. 11-18, the light 1 emitted from the LED 2 may be read, measured and/or detected by the detector 4 located in the cavity 195. Ambient light outside of the cavity 195 may enter the cavity 195 through the aperture 210 and/or the lens 290. One or more of the finishes 5a and/or the coatings 5b of the emitting surface 3 of the LED 2 may absorb excess ambient light and/or may prevent and/or may retard reflection of excess ambient light in a direction towards the detector 4.

In an embodiment, the cap 190 may have a channel 230 which may be connected to the cavity 195. The channel 230 may allow the electrical connection 8 and/or the electrical connection 10 to extend from the detector 4 and/or the LED 2, respectively, to the control circuit 122. For example, the control circuit 122 may be located in the exterior of the cap 190, and the channel 230 may connect the cavity 195 to the exterior of the cap 190.

As generally illustrated in FIGS. 17 and 18, a member 255 may be located in the cavity 195. The member 255 may extend from the bottom end 216 of the cavity 195 to a position between the aperture 210 and the bottom end 216 of the cavity 195. The detector 4 may be mechanically connected to the member 255 and/or may be directly connected to the member 255. The member 255 may position the detector 4 adjacent to the aperture 210 and/or may align the detector 4 with the aperture 210. The detector 4 may absorb the ambient light entering the cavity 195 to prevent the LED 2 from being destabilized by the light entering the cavity. In an embodiment, the detector 4 may measure the ambient light entering the cavity 195.

The systems 20, 40, 60, 80, 100, 120, 140, 160, 180, 200 may be used to determine the volume of a compartment, a position of a movable element within the compartment and/or a velocity of a movable element within the compartment as disclosed in U.S. Pat. Nos. 7,703,279; 7,518,100; 7,476,842; 7,468,522; 7,456,385; 7,388,188; 7,348,542; 7,291,830; 7,180,053; and 6,952,009, incorporated by reference in their entireties.

For example, referring again to FIGS. 10-18 and 27, the systems 140, 160, 180, 200 may have an additional detector 204, such as, for example, a light intensity detector, a photodiode, a phototransistor and/or other like detector that may output a current and/or a voltage which indicates a light intensity detected. For example, the additional detector 204 may be located in a compartment 221, may extend into the compartment 221 and/or may detect and/or may measure an intensity of light in the compartment 221. The compartment 221 may be, for example, a storage tank, a hollow tube, a cylinder, and/or the like. The cylinder may be, for example, a hydraulic cylinder, a pneumatic cylinder, a gas cylinder and/or the like. The compartment 221 may be any compartment known to one having ordinary skill in the art, and the present invention is not limited to a specific embodiment of the compartment 221.

The intensity of light in the compartment 221 may correspond to a volume of the compartment 221 and/or a position of a movable element (not shown) in the compartment 221. The cavity 195 may be located in a position opposite to the compartment 221 such that the aperture 210 and/or the lens 290 may be located between the compartment 221 and the cavity 195. As shown in FIG. 10, the additional detector 204 may be electrically connected to a microprocessor 225 which may use the voltage and/or the current emitted by the additional detector 204 to determine the intensity of light in the compartment 221. The additional detector 204 may be electrically connected to a microprocessor 225 with an electrical connection 12. The electrical connection 12 may be any electrically conductive connection, such as, for example, one or more wires, leads, solder joints and/or the like. The present invention is not limited to a specific embodiment of the additional detector 4, and the additional detector 4 may be any detector for reading and/or measuring light intensity as known to one having ordinary skill in the art.

As illustrated in FIGS. 11-14, 17 and 18, the additional detector 204 may be mechanically connected to the platform 6 such that the additional detector 204 is located on an opposite side of the platform 6 relative to the cavity 195. As illustrated in FIGS. 15 and 16, the additional detector 204 may be located partially within the cavity 195. For example, the additional detector 204 may be secured by an additional support 251 which may be located in the cavity 195. For example, the additional support 251 may be suspended from the platform 6 and/or the top end 214 of the cavity 195. In such an embodiment, the additional detector 204 may extend through an additional aperture 211 in the platform 6 and/or the top end 214 of the cavity 195. The channel 230 may allow the electrical connection 12 to extend from the additional detector 204 to the microprocessor 225. FIGS. 11-14, 17 and 18 depict the systems 140, 160 and 200 having the additional detector 204 located in the compartment 221, and FIGS. 15 and 16 depict the system 180 having the additional detector 204 extending from the cavity 195 into the compartment 221. However, the systems 140, 160, 200 may implement the additional detector 204 extending from the cavity 195 into the compartment as shown in FIGS. 15 and 16, and the system 180 may implement the additional detector 204 located in the compartment 221 as shown in FIGS. 11-14, 17 and 18.

The control circuit 122 may use the detector 4 located in the cavity 195 to determine an intensity of light 1 emitted from the LED 2 by monitoring a voltage and/or a current produced by the detector 4 in response to absorption of light 1 by the detector 4. The control circuit 122 may instantaneously change a voltage and/or a current applied to the LED 2 to regulate the intensity of light 1 emitted from the LED 2 in response to the voltage and/or the current produced by the detector 4 located in the cavity 195. Accordingly, the detector 4 located in the cavity 195 may enable the intensity of light 1 emitted from the LED 2 to be substantially uniform and/or stable over a period of time, and the additional detector 204 may monitor the volume of the compartment 221 and/or a position of a movable element in the compartment 221 over the period of time.

As shown in FIGS. 19-24, the compartment 221 may use mirrored surfaces 300 to limit walls of the compartment 221 from absorbing the light emitted by the LED 2 into the compartment 221. The mirrored surfaces 300 may reflect the light emitted by the LED 2 into the compartment 221. In an embodiment, the mirrored surfaces 300 may be a coating on an object, and the coating may reflect the light emitted by the LED 2 into the compartment 221. In an embodiment, the mirrored surfaces 300 may not degrade in color over time.

For example, as generally illustrated in FIGS. 19 and 20, the mirrored surfaces 300 may be provided by a spring 310 which may be located in the compartment 221. The spring 310 may be manufactured from any material; in an embodiment, the spring 310 may be manufactured from steel. In an embodiment, the spring 310 may be coated with a material and/or colored to enhance limiting walls of the compartment 221 from absorbing the light emitted by the LED 2.

The spring 310 may be located at least partially within the compartment 221. In an embodiment, the spring 310 may be connected to the compartment 221. The spring 310 may move between an extended position and a retracted position. For example, the spring 310 may be connected to the movable element (not shown) located in the compartment 221, and/or the spring 310 may move from one of the extended position and the retracted position to the other position in response to movement of the movable element. The mirrored surfaces 300 may be provided by additional springs 310, and the present invention is not limited to a specific number of the springs 310.

As generally illustrated in FIGS. 21 and 22, the mirrored surfaces 300 may be provided by nesting rings 320 which may be located in the compartment 221. The nesting rings 320 may be located at least partially within the compartment 221. In an embodiment, the nesting rings 320 may be connected to the compartment 221. The nesting rings 320 may move between an extended position and a retracted position. For example, the nesting rings 320 may be connected to the movable element (not shown) located in the compartment 221, and/or the nesting rings 320 may move from one of the extended position and the retracted position to the other position in response to movement of the movable element. For example, the nesting rings 320 may have a base 321, and the radius of each ring of the nesting rings 320 may decrease as the distance from the base 321 increases. Accordingly, movement from the extended position to the retracted position may be accomplished by each of the nesting rings 320 sliding toward the base 321 to encompass an adjacent ring of the nesting rings 320. Movement from the retracted position to the extended position may be accomplished by each of the nesting rings 320 sliding away from the base 321 to uncover the adjacent ring of the nesting rings 320. In an embodiment, the nesting rings 320 may be coated with a material and/or colored to enhance limiting walls of the compartment 221 from absorbing the light emitted by the LED 2.

As generally illustrated in FIGS. 23 and 24, the mirrored surfaces 300 may be provided by a spiral 330 which may be located in the compartment 221. The spiral 330 may be located at least partially within the compartment 221. In an embodiment, the spiral 330 may be connected to the compartment 221. The spiral 330 may move between an extended position and a retracted position. For example, the spiral 330 may be connected to the movable element (not shown) located in the compartment 221, and/or the spiral 330 may move from one of the extended position and the retracted position to the other position in response to movement of the movable element. For example, the spiral 330 may have a base 331 to enable movement from the extended position to the retracted position to be accomplished by components of the spiral 330 sliding toward the base 331. Movement from the retracted position to the extended position may be accomplished by components of the spiral 330 sliding away from the base 331. In an embodiment, the spiral 330 may be coated with a reflective material and/or colored with a non-absorbent color to enhance limiting walls of the compartment 221 from absorbing the light emitted by the LED 2.

Figure 26:
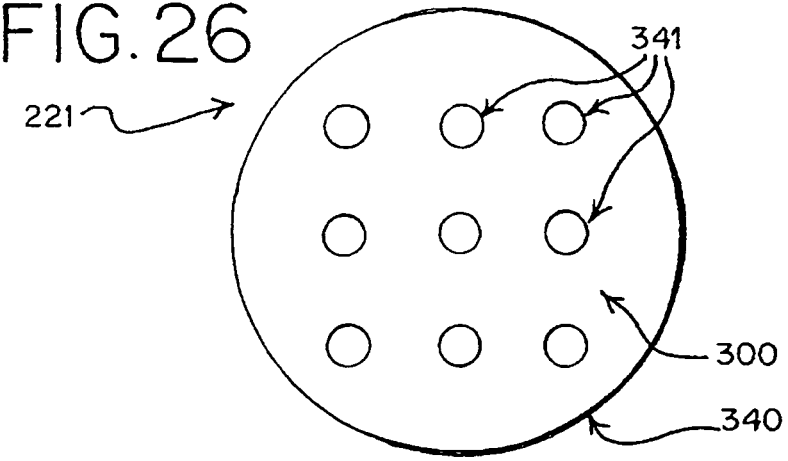
FIG. 26 illustrates a top view of a target in an embodiment of the present invention.

As generally illustrated in FIGS. 25 and 26, the mirrored surfaces 300 may be provided by a target 340 which may be located in the compartment 221. The target 340 may be located at least partially within the compartment 221. In an embodiment, the target 340 may be connected to the compartment 221. The target 340 may have any shape. In an embodiment, the target 340 may have a shape which is circular and/or concave. The target 340 may have holes 341 which may prevent the target 340 from collecting debris and/or may enable debris to pass through the target 340. In an embodiment, the target 340 may be coated with a reflective material and/or colored with a non-absorbent color to enhance limiting walls of the compartment 221 from absorbing the light emitted by the LED 2.

Figure 27:
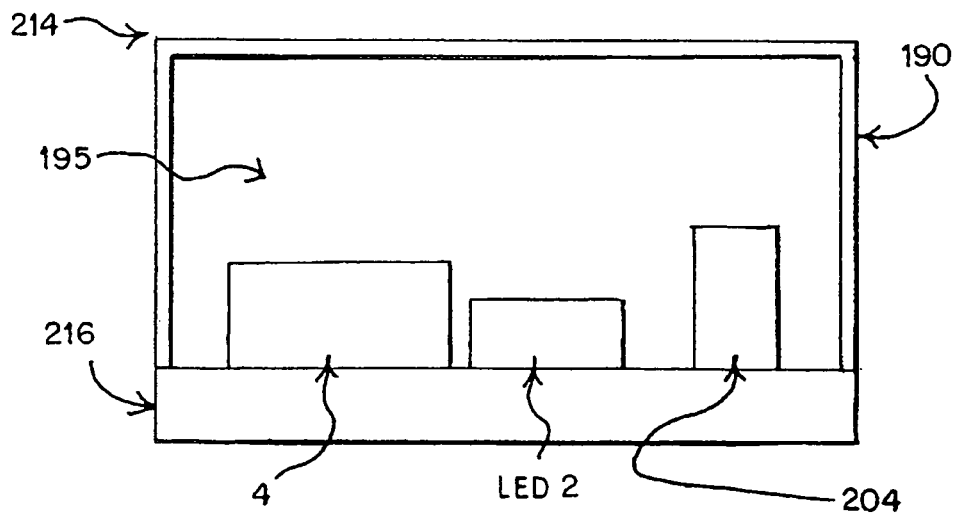
FIG. 27 illustrates a cross-sectional view of a system for reading, measuring and/or controlling intensity of light emitted from an LED in an embodiment of the present invention.

As generally illustrated in FIG. 27, the cap 190 and/or the cavity 195 which may house the detector 4, the additional detector 204 and/or the LED 2 may not have an opening. For example, the cap 190 and/or the cavity 195 may not have the aperture 210. The cap 190 and/or the cavity 195 which may not have an opening may prevent ambient light from entering the cavity 195 and/or may prevent the light 1 emitted from the emitting surface 3 of the LED 2 to exit the cavity 195. The detector 4, the additional detector 204 and/or the LED 2 may be connected to the bottom end 216 of the cavity 195. The bottom end 216 of the cavity 195 may be, for example, a printed circuit board, a plastic surface, a metal surface and/or the like.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for controlling light emitted from a light source, the system comprising:
a compartment having ambient light wherein one end of the compartment is defined by a platform;
an aperture in the platform;
a cap having a first end and a second end wherein the second end is located in a position opposite to the first end and further wherein the first end of the cap is connected to the platform;
a cavity in the cap wherein the platform and the aperture are located between the cavity and the compartment;
an LED that emits light wherein the LED is located in the cavity and further wherein the light emitted from the LED has an intensity wherein the LED has an emitting surface to transmit the light emitted from the LED;
a first detector located in the cavity wherein the platform is located between the compartment and the first detector wherein the first detector is adjacent to the LED to detect the intensity of the light emitted directly from the emitting surface of the LED and further wherein the compartment prevents the first detector from exposure to the ambient light; and
a control circuit for monitoring the intensity of the light detected by the first detector wherein the control circuit is electrically connected to the first detector and the LED wherein the control circuit regulates the intensity of light emitted by the LED.

2. The system of claim 1 further comprising:
a finish on the emitting surface of the LED which retards reflection of the ambient light wherein the finish on the emitting surface enables the light emitted from the LED to travel through the finish and into the environment.

3. The system of claim 1 further comprising:
a second detector located in the compartment wherein the second detector measures the intensity of light in the compartment.

4. The system of claim 1 further comprising:
fingers located in the cavity wherein the fingers connect the LED to the platform.

5. The system of claim 1 further comprising:
a mirrored surface in the compartment that reflects the light emitted from the LED.

6. The system of claim 1 wherein the platform is substantially flat and further wherein the platform is a printed circuit board.

7. The system of claim 1 further comprising:
a member that extends from the second end of the cavity to a position between the aperture and the second end of the cavity wherein the first detector is mechanically connected to the member and further wherein the member aligns the first detector with the aperture.

8. The system of claim 1 further comprising:
a support located in the cavity wherein the support is connected to the platform and further wherein the LED is connected to the support wherein the support aligns the LED with the aperture and maintains a distance of the LED from the aperture.

9. A system for reading light emitted from a light source, the system comprising:
a compartment having ambient light wherein the compartment has a platform which forms one end of the compartment;
an aperture in the platform;
a cavity located on an opposite side of the platform relative to the compartment wherein the aperture is located between the compartment and the cavity;
an LED to emit light from the cavity through the aperture into the compartment wherein the light emitted from the LED has an intensity and further wherein the LED is located in the cavity;
a first detector adjacent to the LED to detect the intensity of light emitted directly from the LED wherein the intensity of the light emitted from the LED is held constant due to feedback from the first detector and further wherein the first detector is not exposed to the ambient light; and
a second detector which extends into the compartment wherein the second detector measures the intensity of light in the compartment.

10. The system of claim 9 further comprising:
a control circuit for monitoring the intensity of light detected by the first detector wherein the control circuit is electrically connected to the first detector and the LED and further wherein the control circuit regulates the intensity of light.

11. The system of claim 9 further comprising:
a lens sized to fit into the aperture wherein the lens focuses the light emitted from the LED through the aperture to the compartment and further wherein the lens focuses the ambient light into the cavity.

12. The system of claim 9 further comprising:
fingers located in the cavity wherein the fingers connect the LED to the platform adjacent to the aperture.

13. The system of claim 9 further comprising:
a support located in the cavity wherein the support is connected to the platform and further wherein the LED is connected to the support wherein the support aligns the LED with the aperture and maintains a distance of the LED from the aperture.

14. The system of claim 9 further comprising:
a support located in the cavity wherein the support is connected to the platform and further wherein the LED and the first detector are connected to the support wherein the support aligns the LED with the aperture and maintains a distance of the LED from the aperture and further wherein the support maintains a position of the first detector.

15. The system of claim 9 further comprising:
an additional aperture in the platform wherein the second detector is partially located in the cavity and further wherein the second detector extends from the cavity through the additional aperture into the compartment.

16. The system of claim 9 wherein the second detector is mechanically connected to the platform and further wherein the platform is located between the first detector and the second detector.

17. The system of claim 9 wherein the platform is manufactured from a material which prevents infrared light from traveling through the platform into the cavity.

18. A method for controlling light emitted from a light source, the method comprising the steps of:
emitting light from an LED into a compartment having a platform which has an aperture wherein the LED and a first light intensity detector are located in a cavity and further wherein the platform and the aperture are located between the cavity and the compartment wherein the light emitted from the LED travels through the aperture and further wherein a second light intensity detector is located in the compartment;
obtaining measurements of an intensity of the light emitted from the LED onto the first light intensity detector;
preventing the first light detector from being exposed to ambient light;
adjusting the intensity of the light emitted from the LED in response to the measurements such that the intensity remains uniform; and
determining an intensity of light in the compartment using the second light intensity detector.

19. The method of claim 18 further comprising the step of:
adjusting the intensity of the light emitted from the LED using a control circuit which is electrically connected to the first light intensity detector and the LED.

20. The method of claim 18 further comprising the step of:
retarding reflection of the ambient light from the LED using a finish on the LED wherein the finish allows the light emitted from the LED to travel through the finish and into the compartment.

21. The method of claim 18 further comprising the step of:
aligning the LED with the aperture and maintaining a distance of the LED from the aperture using a support connected to the platform wherein the support is located in the cavity and further wherein the LED is connected to the support.

* * * * *